United States Patent
Ahn et al.

(10) Patent No.: US 8,097,689 B2
(45) Date of Patent: Jan. 17, 2012

(54) CURABLE ORGANOSILICON COMPOSITION

(75) Inventors: Dongchan Ahn, Midland, MI (US); Patricia A. Olney, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 219 days.

(21) Appl. No.: 12/305,596

(22) PCT Filed: Jun. 19, 2007

(86) PCT No.: PCT/US2007/014251
§ 371 (c)(1), (2), (4) Date: Jun. 16, 2009

(87) PCT Pub. No.: WO2007/149422
PCT Pub. Date: Dec. 27, 2007

(65) Prior Publication Data
US 2009/0306307 A1    Dec. 10, 2009

Related U.S. Application Data

(60) Provisional application No. 60/815,049, filed on Jun. 20, 2006.

(51) Int. Cl.
*C08F 30/08* (2006.01)
(52) U.S. Cl. ......................................... 526/279; 522/99
(58) Field of Classification Search .................. 526/279; 522/99
See application file for complete search history.

(56) References Cited

U.S. PATENT DOCUMENTS

| | | | |
|---|---|---|---|
| 3,275,611 A | 9/1966 | Mottus et al. | |
| 5,106,928 A | 4/1992 | Skoultchi et al. | |
| 5,539,070 A | 7/1996 | Zharov et al. | |
| 5,686,544 A | 11/1997 | Pocius | |
| 6,121,165 A | 9/2000 | Mackey et al. | |
| 6,169,142 B1 | 1/2001 | Nakano et al. | |
| 6,361,716 B1 | 3/2002 | Klayer et al. | |
| 6,380,301 B1 | 4/2002 | Enami et al. | |
| 6,433,057 B1 | 8/2002 | Bhagwagar | |
| 6,509,423 B1 | 1/2003 | Zhu | |
| 6,620,515 B2 | 9/2003 | Feng et al. | |
| 6,706,831 B2 | 3/2004 | Sonnenschein et al. | |
| 6,762,260 B2 | 7/2004 | Sonnenschein et al. | |
| 6,777,512 B1 * | 8/2004 | Sonnenschein et al. | 526/196 |
| 6,791,839 B2 | 9/2004 | Bhagwagar | |
| 6,806,330 B1 | 10/2004 | Sonnenschein et al. | |
| 6,825,298 B2 | 11/2004 | Sonnenschein et al. | |
| 6,939,932 B2 | 9/2005 | Kneafsey et al. | |
| 7,157,399 B2 | 1/2007 | Sonnenschein et al. | |
| 7,732,543 B2 * | 6/2010 | Loch et al. | 526/196 |

FOREIGN PATENT DOCUMENTS

| | | |
|---|---|---|
| EP | 0339803 B1 | 1/1992 |
| WO | 0144311 A1 | 6/2001 |
| WO | 2005017006 A1 | 2/2005 |

OTHER PUBLICATIONS

International Search Report for PCT/US2007/014251, dated Dec. 14, 2007; 3 pages.
DeSimone et al., "Dispersion Polymerizations in Supercritical Carbon Dioxide", Science, vol. 265, Jul. 15, 1994, pp. 356-359.
Wilson et al., "Thermally Conductive Adhesives for High Thermally Stressed Assembly", Dow Corning, 1999, 6 pages.
Soderquist et al., "Hydroboration. 56. Convenient and Regiospecific Route to Functionalized Organosilanes through the Hydroboration of Alkenylsilanes", Journal of Organic Chemistry, 1980, vol. 45, No. 18, pp. 3571-3578.
Brandrup et al., "Polymer Handbook", 3rd edition, 1989, John Wiley & Sons, Inc., New York, pp. VII/379-VII/382.
Arshady, R., "Suspension, emulsion and dispersion polymerization: A methodological survey", Colloid & Polymer Science, 1992, vol. 270, No. 8, pp. 717-732.
"Dow Corning® Silanes", Dow Corning product brochure, 2000, 3 pages.
"Information About Dow Corning® Brand Thermally Conductive Materials", Dow Corning product brochure, 1999, 13 pages.
Kirk et al., "Kirk-Othmer Encyclopedia of Chemical Technology; Silicone Compounds to Succinic Acid and Succinic Anhydride", 4th edition, 1997, vol. 22, John Wiley & Sons, Inc., New York, NY, pp. 94-98.
Noll, W., "Chemistry and Technology of Silicones", 1968, Academic Press, Inc., Orlando, p. 3.

* cited by examiner

*Primary Examiner* — Kuo-Liang Peng
(74) *Attorney, Agent, or Firm* — Howard & Howard Attorneys PLLC

(57) ABSTRACT

A curable organosilicon composition includes a radical curable organosilicon compound, an organoborane-amine complex, a condensation curable organosilicon compound, a condensation cure catalyst, and a condensation-reactive cross-linking compound. The curable organosilicon composition may further include an amine-reactive compound. A method of forming the curable organosilicon composition introduces the organoborane-amine complex and the amine-reactive compound into separate reaction vessels. The curable organosilicon composition is used to form various articles.

25 Claims, No Drawings

CURABLE ORGANOSILICON COMPOSITION

RELATED APPLICATIONS

This application claims priority to and all the advantages of International Patent Application No. PCT/US 2007/014251, filed on Jun. 19, 2007, which claims priority to U.S. Provisional Patent Application No. 60/815,049, filed on Jun. 20, 2006.

FIELD OF THE INVENTION

The present invention relates to a curable organosilicon composition that includes a radical curable organosilicon compound, a condensation curable organosilicon compound, a condensation reactive cross-linking compound, an organoborane-amine complex, and a condensation cure catalyst.

DESCRIPTION OF THE RELATED ART

Curable organosilicon compositions are known in the art and have been investigated for use in industrial processes to form coatings, adhesives, inks, and articles. These compositions may be cured using a variety of systems comprising hydrosilylation, condensation, and peroxide based systems. However, use of any of the aforementioned systems has drawbacks.

The hydrosilylation systems utilize hydrosilylation catalysts that include transition metals such as rhodium and platinum. The hydrosilylation catalysts are expensive, have limited functionality due to a potential deactivation upon exposure to inhibiting agents such as nitrogen, phosphorous, sulfur, tin, and/or arsenic. If exposed, the hydrosilylation catalysts are poisoned and the curable organosilicon compositions exhibit reduced functionality, selectivity, and usefulness. When exposed to the inhibiting agents, the hydrosilylation curable organosilicon systems exhibit a tendency to improperly cross-link leading to insufficient cures and insufficient bonding to substrates. The insufficient cure and bonding may be remedied by increasing a curing temperature. However, this leads to increased production costs and energy expenditure.

The condensation systems utilize condensation catalysts that include metals such as tin, titanium, aluminum, zirconium, bismuth, lead, cobalt, antimony, manganese, hafnium, and vanadium and may also include amines and amides. The condensation curing systems also have limited functionality due to a requirement of moisture activation of the condensation curing reaction which is not effective when used in applications that must be cured in depth or in confinement, as is known in the art. As such, the condensation catalysts are not preferred for use in some common adhesive, coating, and ink applications.

When the curable organosilicon compositions are cured using the peroxide based systems, high temperatures are required to initiate the cure or limited storage stability at ambient temperatures can result. Also, these peroxide based systems are easily inhibited in the presence of atmospheric oxygen leading to uncured or poorly cured products having wet surfaces. Undesirable decomposition by-products may also be generated.

One alternative means of curing compositions comprising siloxane components is disclosed in U.S. Pat. No. 6,777,512 to Sonnenschein et al. The '512 patent discloses using an organoborane-amine complex to cure a composition comprising both polymerizable siloxane components and organic monomers. The polymerizable siloxane components have a siloxane backbone and reactive moieties capable of polymerization. The organic monomers are acrylates and typically are methylmethacrylate (MMA). The organoborane-amine complex overcomes the issues of using the hydrosilylation systems, the condensation systems, and the peroxide based systems, as the organoborane-amine complex is resistant to inhibition by the inhibiting agents and does not require moisture to activate the cure. However, a limited compatibility and high surface tension of the organoborane-amine complex and other components relative to the siloxane components has a tendency to cause higher energy components, which are necessary for curing, to be depleted from a surface, resulting in incomplete cure. Additionally, inclusion of the MMA in the curable organosilicon composition of the '512 patent reduces the thermal stability, moisture resistance, and flexibility, of the curable organosilicon composition, after cure. Specifically, cured and polymerized acrylic monomers, e.g., polymethylmethacrylate (PMMA), are not as thermally stable as the siloxane components and are subject to degradation, cracking and decomposition with prolonged exposure to elevated temperatures. Also, the PMMA is hygroscopic and tends to absorb moisture leading to inconsistent physical properties. Further, the PMMA has little flexibility and is thereby subject to cracking and degradation. Although the method of forming the curable composition overcomes the issues of using the hydrosilylation systems, the condensation systems, and the peroxide based systems, the curable organosilicon composition, after cure, is not preferred for use over conventional curable organosilicon compositions in certain industries due to the reduced thermal stability, moisture resistance, and flexibility.

Accordingly, there remains an opportunity to form a curable organosilicon composition comprising an organoborane-amine complex that is resistant to inhibition by inhibiting agents and/or oxygen, and that reduces production costs. There also remains an opportunity to form a curable organosilicon composition that has increased thermal stability, moisture resistance, and flexibility. There further remains an opportunity to form a curable organosilicon composition that rapidly cross-links, bonds to substrates at room temperature, and cures without a wet and/or incompletely cured surface.

SUMMARY OF THE INVENTION AND ADVANTAGES

The present invention provides a curable organosilicon composition comprising a radical curable organosilicon compound, an organoborane-amine complex, a condensation curable organosilicon compound, a condensation cure catalyst, and a condensation-reactive cross-linking compound for cross-linking the condensation curable organosilicon compound. A method of forming the curable organosilicon composition is also disclosed.

The various components of the curable organosilicon composition of the present invention generally provide a 'dual cure' mechanism employing both organoborane and condensation cure chemistries. Further, this curable organosilicon composition cures at reduced temperatures and can be utilized in a wide range of curing conditions due to an ability to cure more rapidly in deep and confined areas, thereby reducing production costs and energy expenditure associated with operating curing ovens and/or long curing cycles. The curable organosilicon composition is also resistant to inhibitors of Pt-group hydrosilylation catalysts and exhibits increased thermal stability. The curable organosilicon composition also contributes to formation of a more completely cured surface of the second layer thereby decreasing surface wetness of the second layer. These advantages are especially important if the curable organosilicon composition is used in various applications including, but not limited to, rubbers, tapes, adhesives, inks, protective coatings, films, encapsulants, gels, electronic components, photonic components, acoustic dampening components, thermoplastic articles, thermoset articles, sealants, foams, gaskets, seals, o-rings, connectors, pressure sensitive adhesives, paper coatings, release coatings, and combinations thereof.

The curable organosilicon composition also rapidly cross-links and may bond to various materials at reduced temperatures including, but not limited to, plastics, metals, and other inorganic surfaces. This increases production efficiency and speed and further reduces production costs and energy expenditure associated with heating.

DETAILED DESCRIPTION OF THE INVENTION

The present invention provides a curable organosilicon composition, an article, and a method of forming the curable organosilicon composition. The curable organosilicon composition, hereafter simply referred to as "composition", may be used in any industry. In one embodiment, the composition is substantially free of radical curable compounds that do not include one or more silicon atoms or are not capable of reacting in-situ via a non-radical mechanism upon mixing to form a free radical curable compound that includes silicon. In another embodiment, the composition is substantially free of acrylates and alkacrylates that do not include silicon, including, but not limited to, methylmethacrylate, polymethylmethacrylate, and combinations thereof. It is to be understood that the terminology "substantially free" refers to a concentration of less than 5,000, alternatively of less than 900, and alternatively of less than 100, parts of the radical curable compounds that do not include one or more silicon atoms or the acrylates and alkacrylates, per one million parts of the composition. The composition is, at a minimum, curable by heat.

Generally, the composition includes a radical curable organosilicon compound, an organoborane-amine complex, a condensation curable organosilicon compound, a condensation cure catalyst, and a condensation-reactive cross-linking compound for cross-linking the condensation curable organosilicon compound. In one embodiment, the composition includes the radical curable organosilicon compound, the organoborane-amine complex, the condensation curable organosilicon compound, the condensation cure catalyst, the condensation-reactive cross-linking compound, and additionally an amine-reactive compound. In a further embodiment, the composition includes the reaction product of the radical curable organosilicon compound, the condensation curable organosilicon compound, and the condensation-reactive cross-linking compound and also includes the organoborane-amine complex and the condensation cure catalyst and, optionally, the amine-reactive compound.

In yet a further embodiment, the composition includes a reaction product of any two of (i) the radical curable organosilicon compound, (ii) the condensation curable organosilicon compound, and (iii) the condensation-reactive cross-linking compound, includes the other of (i), (ii), and (iii) that is not reacted as part of the reaction product (A), includes the organoborane-amine complex, and includes the condensation cure catalyst. In other words, in this yet further embodiment, any two of the radical curable organosilicon compound, the condensation curable organosilicon compound, and the condensation-reactive cross-linking compound are pre-reacted, and the one component of these three that is not pre-reacted is merely combined, along with the organoborane-amine complex and with the condensation cure catalyst, to form the composition. The two components are pre-reacted in that the reacted prior to, or at a minimum separate from, introduction of the other components to make up the composition.

The radical curable organosilicon compound may be any known in the art and may include more than one radical curable organosilicon compound. In one embodiment, the radical curable organosilicon compound is selected from the group of an organosilane, an organopolysiloxane, and combinations thereof. Alternatively, the radical curable organosilicon compound includes acryloxyalkyl- and methacryloxyalkyl-functional silanes (hereinafter referred to jointly as acrylic functional silanes), acryloxyalkyl- and methacryloxyalkyl-functional organopolysiloxanes, and combinations thereof. It is to be understood that acryloxyalkyl, for purposes of the present invention, is equivalent to acryloyloxyalkyl.

The radical curable organosilicon compound may be a monomer, dimer, oligomer, pre-polymer, polymer, co-polymer, and combinations thereof. In one embodiment, the radical curable organosilicon compound includes a combination of monomers, dimers, oligomers, pre-polymers, and polymers to impart a desired combination of bulk and surface properties such as cure rate, modulus, and adhesion, to the composition.

The radical curable organosilicon compound may have an average of at least one free radical polymerizable group and an average of 0.1 to 50 mole percent of the free radical polymerizable groups including unsaturated organic moieties. The unsaturated organic groups may include, but are not limited to, alkenyl groups, alkynyl groups, acrylate-functional groups, methacrylate functional groups, and combinations thereof. "Mole percent" of the unsaturated organic groups is defined as a ratio of a number of moles of unsaturated organic groups comprising siloxane moieties in the radical curable organosilicon compound to a total number of moles of siloxane moieties in the radical curable organosilicon compound, multiplied by 100.

The radical curable organosilicon compound may include a non-radical reactive functional group incorporated in the free radical polymerizable group. The radical curable organosilicon compound may be monofunctional or multifunctional with respect to the non-radical reactive functional group and may allow for polymerization or curing of the radical curable organosilicon compound to linear polymers, branched polymers, copolymers, cross-linked polymers, and combinations thereof. The functional group may include any known in the art used in addition and/or condensation curable compositions.

The radical curable organosilicon compound may include an organosilane having the general structure:

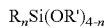

$R_nSi(OR')_{4-n}$ wherein n is an integer of less than or equal to 4 and wherein at least one of R and R' independently includes the free radical polymerizable group. If only one of the R and/or R' includes the free radical polymerizable group, the other may include a monovalent organic group free of aliphatic unsaturation. The R and/or R' may independently include one of a hydrogen, a halogen atom, and an organic group including, but not limited to, alkyl groups, haloalkyl groups, aryl groups, haloaryl groups, alkenyl groups, alkynyl groups, acrylate and methacrylate groups. The R and/or R' may also each independently include other organic functional groups including, but not limited to, glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, hydroxyl groups, and combinations thereof. The monovalent organic group has from 1 to 20 and alternatively from 1 to 10, carbon atoms. The monovalent organic group may include alkyl groups including, but not limited to, methyl, ethyl, propyl, pentyl, octyl, undecyl, octadecyl groups, and combinations thereof, in addition to cycloalkyl groups including, but not limited to, a cyclohexyl group. The monovalent organic group may further include aryl groups including, but not limited to, phenyl, tolyl, xylyl, benzyl, 2-phenylethyl groups, and combinations thereof. The monovalent organic group may still further include an alkyloxypoly(oxylalkylene) group including, but not limited to, propyloxypoly(oxyethylene), propyloxypoly(oxypropylene), propyloxy-poly(oxypropylene)-co-poly(oxyethylene), halogen substituted versions thereof, and combinations thereof. Additionally, the monovalent organic group may include a cyanofunctional group including, but not limited to, a cyanoalkyl group including a cyanoethyl group, a cyanopropyl group, and combinations thereof. The monovalent organic group may also include a halogenated hydrocarbon group including, but not limited to, 3,3,3-trifluoropropyl, 3-chloropropyl, dichlorophenyl, and 6,6,6,5,5,4,4,3,3-nonafluorohexyl groups, and combinations thereof. The monovalent organic group may still further include carbazole groups such as 3-(N-carbazolyl)propyl, arylamino-functional groups such as 4-(N,N-diphenylamino)phenyl-3-propyl, and halogenated hydrocarbon groups such as 3,3,3-trifluoropropyl, 3-chloropropyl, dichlorophenyl, and 6,6,6,5,5,4,4,3,3-nonafluorohexyl. The radical polymerizable group may include an aliphatic unsaturated group in which at least one double bond is located at a terminal position, an internal position, or at both the terminal and the internal positions. Alternatively, the radical polymerizable group may include acrylate groups, methacrylate groups, and combinations thereof.

Suitable examples of radical curable organosilicon compounds include, but are not limited to, 3-methacryloxypropyltrimethoxysilane, methacryloxymethyltrimethoxysilane, 3-methacryloxypropyltriethoxysilane, 3-acryloxypropyltrimethoxysilane, acryloxymethyltrimethoxysilane, 3-methacryloxypropyltrimethylsilane, 3-methacryloxypropyldimethylmonomethoxysilane, 3-methacryloxypropylmethyldimethoxysilane, 3-acryloxypropyltriethoxysilane, 3-acryloxypropyldimethylmonomethoxysilane, 3-acryloxylpropyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy)methylsilane, di-(3-butenyl-1-oxy)dimethylsilane, 3-butenyl-1-oxy trimethylsilane, and combinations thereof.

The radical curable organosilicon compound may have a linear, branched, hyperbranched, or resinous structure and may also be homopolymeric or copolymeric. The radical curable organosilicon group may also include at least one of an acrylate group and a methacrylate group. Alternatively, the radical curable organosilicon group includes an acryloxyalkyl group such as an acryloxypropyl group, a methacryloxyalkyl group such as a methacryloxypropyl group, and/or an unsaturated organic group including, but not limited to, an alkenyl group having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic group may include the radical polymerizable group in oligomeric and/or polymeric polyethers including an allyloxypoly(oxyalkylene) group, halogen substituted analogs thereof, and combinations thereof.

Alternatively, the radical curable organosilicon compound includes a compound formed by copolymerizing organic compounds having polymeric backbones with the radical curable organosilicon compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. The organic compound can also include a copolymer including polymers having multiple organic functionality, multiple organopolysiloxane functionality, and combinations of organopolysiloxanes with the organic compounds. The copolymer may include repeating units in a random, grafted, or blocked arrangement.

The radical curable organosilicon compound may be a liquid, a gum, or a solid, and may have any viscosity. In one embodiment, the viscosity is equal to or greater than 0.001 Pa·s at 25° C. The resin or solid may become flowable at elevated temperatures or by application of shear.

The radical curable organosilicon compound may have at least one of the following formulae:

$$R^1{}_3SiO(R^1{}_2SiO)_a(R^1R^2SiO)_bSiR^1{}_3; \quad (a)$$

$$R^3{}_2R^4SiO(R^3{}_2SiO)_c(R^3R^4SiO)_dSiR^3{}_2R^4; \quad (b)$$

$$R^3{}_2R^4SiO(R^3{}_2SiO)_c(R^3R^4SiO)_dSiR^3{}_3; \text{ and} \quad (c)$$

combinations thereof. (d)

In Formula (a), a and b are integers and may have an average value of less than or equal to 20,000 while b may have an average value of at least one. Also, $R^1$ may include a monovalent organic group including, but are not limited to, acrylic functional groups such as acryloxymethyl, acryloxypropyl, methacryloxymethyl, and methacryloxypropyl groups, alkyl groups such as methyl, ethyl, propyl, and butyl groups, alkenyl groups such as vinyl, allyl, and butenyl groups, alkynyl groups such as ethynyl and propynyl groups, aromatic groups such as phenyl, tolyl, and xylyl groups, cyanoalkyl groups such as cyanoethyl and cyanopropyl groups, halogenated hydrocarbon groups such as 3,3,3-trifluoropropyl, 3-chloropropyl, dichlorophenyl, and 6,6,6,5,5,4,4,3,3-nonafluorohexyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, alkyloxypoly(oxyalkyene) groups such as propyloxy(polyoxyethylene), propyloxypoly(oxypropylene), and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups, alkoxy groups such as methoxy, ethoxy, n-propoxy, isopropoxy, n-butoxy, and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, epoxyalkyl groups such as 3-glycidoxypropyl, 2-(3,4, epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3-propylisocyanurate, propyl-t-butylcarbamate, and propylethylcarbamate groups, aldehyde functional groups such as undecanal and butyraldehyde groups, anhydride functional groups such as 3-propyl succinic anhydride, 2-ethyl succinic anhydride, methyl succinic anhydride, 3-propyl maleic anhydride, 2-ethyl maleic anhydride, methyl maleic anhydride, carboxylic acid functional groups such as 11-carboxyundecyl, 3-carboxypropyl and 2-carboxyethyl groups, carbazole groups such as 3-(N, N-diphenylamino)phenyl-3-propyl, arylamino-functional groups such as 4-(N,N-diphenylamino)phenyl-3-propyl, and metal salts of carboxylic acids such as the zinc, sodium, and/or potassium salts of 3-carboxypropyl and 2-carboxyethyl groups, and combinations thereof. $R^2$ may include an unsaturated monovalent organic group including, but is not limited to, alkenyl groups such as vinyl, allyl, and butenyl groups, alkynyl groups such as ethynyl and propynyl groups, and acrylic functional groups such as acryloxypropyl and methacryloxypropyl groups, and combinations thereof.

In Formulae (b) and (c), c and d are integers and each may have an average value of less than or equal to 20,000. Each $R^3$ may be the same or different from $R^1$. Additionally, each $R^4$ may independently include an unsaturated organic group including, but not limited to, alkenyl groups such as vinyl, allyl, and butenyl groups, alkynyl groups such as ethynyl and propynyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, acrylic functional groups such as acryloxypropyl and methacryloxypropyl groups, and combinations thereof.

Examples of radical curable organopolysiloxanes include, but are not limited to, 1,3-bis(methacryloxypropyl)tetramethyldisiloxane, 1,3-bis(acryloxypropyl)tetramethyldisiloxane, 1,3-bis(methacryloxymethyl)tetramethyldisiloxane, 1,3-bis(acryloxymethyl)tetramethyldisiloxane, α,ω,-methacryloxymethyldimethylsilyl terminated polydimethylsiloxane, methacryloxypropyl-terminated polydimethylsiloxane, α,ω-acryloxymethyldimethylsilyl terminated polydimethylsiloxane, methacryloxypropyldimethylsilyl terminated polydimethylsiloxane, α,ω-acryloxypropyldimethylsilyl terminated polydimethylsiloxane, pendant acrylate and methacrylate functional polymers such as poly(acryloxypropyl-methylsiloxy) polydimethylsiloxane and poly(methacryloxypropyl-methylsiloxy) polydimethylsiloxane copolymers, telechelic polydimethylsiloxanes having multiple acrylate or methacrylate functional groups including those formed via a Michael addition reaction of multi-acrylate or multi-methacrylate monomers to amine terminated polydimethylsiloxanes, and combinations thereof. Other compounds suitable for use as radical curable organosilicon compounds include, but are not limited to, monofunctional methacrylate or methacrylate terminated organopolysiloxanes such as polydimethylsiloxane terminated at one end by a methacryloxypropyldimethylsilyl group and terminated at another end by n-butyldimethylsilyl groups.

The radical curable organosilicon compound may include a mixture of liquids differing in degree of functionality and/or free radical polymerizable groups. The radical curable organosilicon compound may include a tetra-functional telechelic polydimethylsiloxane prepared by a Michael addition reaction of precursors including a secondary amine terminated polydimethylsiloxane with two molar equivalents of trimethylolpropane tri-acrylate or with two molar equivalents of the reaction product of acryloxypropyltrimethoxysilane with three equivalents of a hydroxyfunctional methacrylate such as 2-hydroxyethylmethacrylate. Such liquids may be formed in-situ with precursors, provided that the Michael addition is of a similar or faster reaction rate than an organoborane-catalyzed curing reaction. The invention is not intended to be limited to the preceding example because numerous other methods of forming organosilicon compounds having more than 2 free radical polymerizable groups may be used.

The Michael addition reaction may provide an increased cure rate and a reduced sol content relative to a di-functional methacryloxypropyldimethylsilyl terminated polydimethylsiloxane of similar degree of polymerization. However, the di-functional methacryloxypropyldimethylsilyl terminated polydimethylsiloxane may provide improved working times and produce a lower modulus organopolysiloxane. Accordingly, a combination of telechelic polydimethylsiloxane having functionality greater than 2 and the di-functional methacryloxypropyldimethylsilyl terminated polydimethylsiloxane may be used.

The radical curable organosilicon compound may include the following structures known as organopolysiloxane resins;

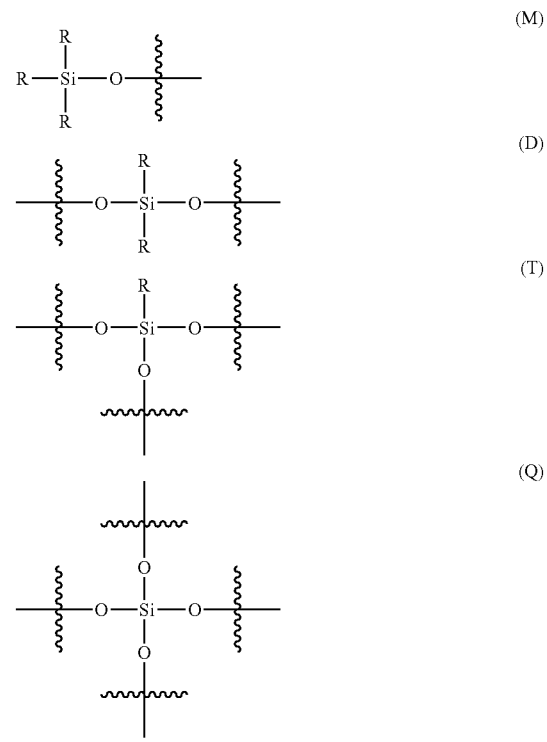

wherein each of M ($R_3SiO_{1/2}$), D ($R_2SiO_{2/2}$), T ($RSiO_{3/2}$), and Q ($SiO_{4/2}$) independently represent functionality of structural groups of organopolysiloxanes.

The organopolysiloxane resin may include MQ resins including $R^5_3SiO_{1/2}$ groups and $SiO_{4/2}$ groups, TD resins including $R^5SiO_{3/2}$ groups and $R^5_2SiO_{2/2}$ groups, MT resins including $R^5_3SiO_{1/2}$ groups and $R^5SiO_{3/2}$ groups, MTD resins including $R^5_3SiO_{1/2}$ groups, $R^5SiO_{3/2}$ groups, and $R^5_2SiO_{2/2}$ groups, and combinations thereof.

Each $R^5$ may include a monovalent organic group and may have from 1 to 20 and alternatively from 1 to 10, carbon atoms. Suitable examples include, but are not limited to, acrylate functional groups such as acryloxyalkyl groups, methacrylate functional groups such as methacryloxyalkyl groups, cyanofunctional groups, and monovalent hydrocarbon groups, and combinations thereof. The monovalent hydrocarbon groups may include alkyl groups such as methyl, ethyl, propyl, pentyl, octyl, undecyl, and octadecyl groups, cycloalkyl groups such as cyclohexyl groups, alkenyl groups such as vinyl, allyl, butenyl, and hexenyl groups, alkynyl groups such as ethynyl, propynyl, and butynyl groups, aryl groups such as phenyl, tolyl, xylyl, benzyl, and 2-phenylethyl groups, halogenated hydrocarbon groups such as 3,3,3-trifluoropropyl, 3-chloropropyl, dichlorophenyl, and 6,6,6,5,5,4,4,3,3-nonafluorohexyl groups, and combinations thereof. The cyano-functional groups may include cyanoalkyl groups such as cyanoethyl and cyanopropyl groups, and combinations thereof.

$R^5$ may include alkyloxypoly(oxyalkyene) groups such as propyloxy(polyoxyethylene), propyloxypoly(oxypropylene) and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene) and perfluoropropyloxy-poly(oxypropylene) copoly(oxyethylene) groups, alkenyloxypoly(oxyalkyene) groups such as allyloxypoly(oxyethylene), allyloxypoly(oxypropylene) and allyloxypoly(oxypropylene) copoly(oxyethylene) groups, alkoxy groups such as methoxy, ethoxy, n-propoxy, isopropoxy, n-butoxy and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, hindered aminoalkyl groups such as tetramethylpiperidinyl oxypropyl groups, epoxyalkyl groups such as 3-glycidoxypropyl, 2-(3,4,-epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3propyl-isocyanurate, propyl-t-butylcarbamate, and propylethylcarbamate groups, aldehyde functional groups such as undecanal and butyraldehyde groups, anhydride functional groups such as 3-propyl succinic anhydride and 3-propyl maleic anhydride groups, carboxylic acid functional groups such as 3-carboxypropyl, 2-carboxyethyl, and 10-carboxydecyl groups, metal salts of carboxylic acids such as zinc, sodium, and potassium salts of 3-carboxypropyl and 2-carboxyethyl groups, and combinations thereof.

Examples of suitable resins include, but are not limited to, $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, and combinations thereof.

The organopolysiloxane resins may be prepared by any method known in the art such as by treating a resin copolymer produced by a silica hydrosol capping process with an alkenyl including endblocking reagent. This method may include reacting a silica hydrosol under acidic conditions with a hydrolyzable triorganosilane such as trimethylchlorosilane, a siloxane such as hexamethyldisiloxane, and combinations thereof, and then recovering a copolymer having M and Q groups including 2 to 5 percent by weight of hydroxyl groups. The copolymer may be reacted with an endblocking agent including unsaturated organic groups and an endblocking agent free of aliphatic unsaturation in amounts sufficient to provide 3 to 30 mole percent of unsaturated organic groups in the resin. Suitable endblocking agents include silazanes, siloxanes, silanes, and combinations thereof.

The radical curable organosilicon compound may include a physical transition temperature, include an organofunctional group with a physical transition temperature or, upon curing, form an organopolysiloxane matrix that has a physical transition temperature, i.e., glass transition or melting transition, such that the curable organosilicon composition undergoes changes marked by softening or non-linear reduction in viscosity on reaching certain temperatures under conditions of use. Organopolysiloxane matrices are useful for phase change compositions such as those found to be useful in thermally conductive phase change thermal interface materials for electronic components. A suitable organopolysiloxane matrix includes an organofunctional silicone wax which may be an uncross-linked organofunctional silicone wax, a cross-linked organofunctional silicone wax, or combinations thereof. Organofunctional silicone waxes including at least one free radical polymerizable group such as acrylate or methacrylate are useful to impart phase changes to the composition.

The radical curable organosilicon compound may be present in an amount from 5 to 95, alternatively from 10 to 95, and alternatively from 40 to 95, parts by weight per 100 parts by weight of the composition. The radical curable organosilicon compound is not equivalent to the alkacrylates first introduced above. Additionally, one or more radical curable organosilicon compounds such as organopolysiloxane linear polymers, resins, and copolymers, may be combined to form the radical curable organosilicon compound to optimize properties such as surface energy, modulus, thermal stability, moisture resistance, and hydrophobic balance.

The composition also includes the organoborane-amine complex which is typically a complex formed between an organoborane and a suitable amine that renders the organoborane-amine complex stable at ambient conditions. Any organoborane-amine complex known in the art may be used. The organoborane-amine complex is capable of initiating polymerization or cross-linking of the radical curable organopolysiloxane through introduction of the amine-reactive compound, and/or by heating. Of course, if the amine-reactive compound, which is not required, is not present, then the organoborane-amine complex initiates polymerization or cross-linking by heating. The organoborane typically includes tri-functional boranes which have the general structure:

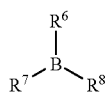

wherein each of $R^6$-$R^8$ independently has 1 to 20 carbon atoms and wherein each of $R^6$-$R^8$ independently include one of a hydrogen, an aliphatic hydrocarbon group and an aromatic hydrocarbon group. The aliphatic and/or aromatic hydrocarbon groups may be linear, branched, and/or cyclic. The organoborane may include, but is not limited to, trimethylborane, tri-ethylborane, tri-n-butylborane, tri-n-octylborane, tri-sec-butylborane, tri-dodecylborane, phenyldiethylborane, and combinations thereof. Typically, the organoborane includes tri-n-butylborane.

The organoborane may be organosilicon functional and may include a functional group including at least one of a silicon atom, a siloxane oligomer, and a siloxane polymer. Useful organosilicon functional organoboranes are described in PCT/US05/044947, the disclosure of which, as related to the organosilicon functional organoboranes, is herein incorporated by reference. The organosilicon functional organoboranes may include a complex including at least one a silicon atom, a siloxane oligomer, and/or a siloxane polymer and may have the formula:

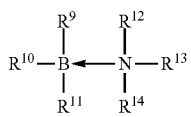

wherein B represents boron. Each of $R^9$, $R^{10}$, and $R^{11}$ is may be selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^9$, $R^{10}$, and $R^{11}$ includes one or more silicon atoms, and is covalently bonded to boron. Each of $R^{12}$, $R^{13}$, and $R^{14}$ typically yields an amine compound or a polyamine compound capable of complexing the boron. Two or more of $R^9$, $R^{10}$, and $R^{11}$ and two or more of $R^{12}$, $R^{13}$, and $R^{14}$ may combine to form heterocyclic structures, provided a sum of the number of atoms from $R^9$, $R^{10}$, $R^{11}$, $R^{12}$, $R^{13}$, and $R^{14}$ does not exceed 11.

Any amine known in the art may be used to form the organoborane-amine complex. Typically, the amine includes at least one of an alkyl group, an alkoxy group, an imidazole group, an amidine group, a ureido group, and combinations thereof. Alternatively, the amines include, but are not limited to, 1,3 propane diamine, 1,6-hexanediamine, methoxypropylamine, pyridine, isophorone diamine, 3-aminopropyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxyethoxy)silane, t-4-(2-aminoethyl)-3-aminopropyltrimethoxysilane, N1-(6-aminohexyl)aminomethyltrimethoxysilane, N-(2-aminoethyl)-11 aminoundecyltrimethoxysilane, aminoethylaminomethylphenethyltrimethoxysilane, N-(2-aminoethyl)-3-aminopropylmethyldimethoxysilane, N-(2-aminoethyl)-3-aminoisobutylmethyldimethoxysilane, (3-trimethoxysilylpropyl)diethylene-triamine, 1,1,2,4-tetramethyl-1-sila-2-azacyclopentane, amine functional organopolysiloxanes including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and 3-propylpyrrole, nitrogen compounds including N-(3-triethyoxysilylpropyl)-4,5-dihydroimidazole, ureidopropyltriethoxysilane, and combinations thereof. The amine may be selected from the group of amine-functional silanes, amine-functional organopolysiloxanes, and combinations thereof. In another embodiment, the amine includes N-(2-aminoethyl)-3-aminopropyltrimethoxysilane.

The organoborane-amine complex may be physically and/or chemically attached (bound) to a solid particle such as a phase support to control working times and stabilize liquid phase organoborane-amine complexes against separating in the composition during storage. Attachment can be accomplished either in-situ or a priori and may include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a condensation reactive compound. The condensation reactive compounds that may be used include, but are not limited to, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl)propylsuccinic anhydride, 2-(4-chlorosulfonylphenyl)ethyltrimethoxysilane, and combinations thereof. The pretreatment may be followed by complexation with the organoborane, or by direct treatment of the solid particles using a preformed organoborane-amine complex that is condensation reactive. Additives such as surface treating agents or impurities that are inherently amine-reactive, may require appropriate pre-cautions to avoid premature decomplexation of the organoborane-amine complex being attached. Solid particles including amine-reactive substances can be purified or neutralized before attachment of the organoborane-amine complex. Alternatively, the attachment of the organoborane-amine complex may be performed in an oxygen free environment.

The organoborane-amine complex may be present in the composition in any amount. Typically, the organoborane-amine complex is present in an amount from 0.01 to 95, alternatively from 0.1 to 80, and alternatively from 1 to 30, parts by weight per 100 parts by weight of the composition. These amounts depend upon a molecular weight and functionality of the organoborane-amine complex and the presence of other components such as fillers. The concentration of boron in the organoborane is typically between 10 and 100, 000, alternatively between 100 and 10,000, and alternatively between 500 and 5,000, parts by weight per one million weight parts of radical curable organosilicon compound.

If the amine-reactive compound is included, then the organoborane-amine complex typically interacts with the amine-reactive compound to initiate polymerization or cross-linking of the composition. This may occur when the amine-reactive compound is mixed with the organoborane-amine complex and exposed to an oxygenated environment at temperatures below a dissociation temperature of the organoborane-amine complex, including room temperature and below.

The amine-reactive compound may include any amine-reactive compound known in the art and can be delivered as a gas, liquid, or solid. The amine-reactive compound may include free radical polymerizable groups or other functional groups such as a hydrolyzable group, and can be monomeric, dimeric, oligomeric or polymeric. The amine-reactive compound typically includes amine-reactive groups that may be attached to an organic compound, an organosilicon compound, an organosilane, or an organopolysiloxane. The amine-reactive groups may be derived from the organoborane-amine complex and/or any additives present and may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof. Alternatively, the amine-reactive compound is selected from the group of isophorone diisocyanate, hexamethylenediisocyanate, toluenediisocyanate, methyldiphenyldiisocyanate, acrylic acid, methacrylic anhydride, undecylenic acid, citraconic anhydride, polyacrylic acid, and combinations thereof. The amine-reactive compound may be selected from the group of organic compounds, silanes and organosiloxanes, and combinations thereof, and may be monomeric, oligomeric, and/or polymeric. The organic compounds, silanes, and/or organosiloxanes may include at least one of an isocyanate functional group, a carboxylic acid functional group, and an anhydride functional group. The amine-reactive compound may include, but is not limited to, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, an amine-reactive organosilane, an organopolysiloxane including 3-isocyanatopropyltrimethoxysilane, isocyanatomethyltrimethoxysilane, 3-glycidoxypropyltrimethoxysilane, a methylsuccinic anhydride- and propylsuccinic anhydride-functionalized linear, branched, resinous, and/or hyperbranched organopolysiloxane, a cyclohexenyl anhydride-functionalized linear, resinous, and/or hyperbranched organopolysiloxane, a carboxylic acid-functionalized linear, branched, resinous, and/or hyperbranched organopolysiloxane such as a carboxydecyl terminated oligomeric or polymeric polydimethylsiloxane, an aldehyde-functionalized linear, branched, resinous, and/or hyperbranched organopolysiloxane such as a undecylenic aldehyde-terminated oligomeric or polymeric polydimethylsiloxane, and combinations thereof. Other compounds that can be used include compounds capable of generating amine-reactive groups when exposed to ultraviolet radiation such as photoacid generators and iodonium salts including $[SbF_6]-$ counter ions and photosensitizing compounds such as isopropylthioxanthone. The amine-reactive compound may be physically and/or chemically bound to a solid phase continuous or discrete support such as various types of solid particles described above, to control working times or to stabilize a liquid phase. The amine-reactive compound may be present in the composition any amount but is typically present in an amount from 0.1 to 95, alternatively from 0.1 to 90, and alternatively from 1 to 50, parts by weight per 100 parts by weight of the composition. The amount depends upon a molecular weight and functionality of the amine-reactive compound and the presence of other components such as fillers. Alternatively, the amine-reactive compound may be present in an amount wherein a molar ratio of amine-reactive groups to amine groups in the curable organosilicon composition is of from 0.1 to 100, alternatively from 0.5 to 50, and alternatively from 0.8 to 20. If the amine-reactive compound includes acrylate groups and/or methacrylate groups, the amine-reactive compound is not equivalent to any alkacrylates first introduced above.

The composition also includes the condensation curable organosilicon compound. Without intending to be bound by any particular theory, it is believed that the condensation curable organosilicon compound is cross-linked with the cross-linking agent and the radical curable organosilicon compound through interaction with the condensation catalyst. The condensation curable organosilicon compound may be any known in the art and may be a monomer, dimer, oligomer, polymer, pre-polymer, co-polymer, and combinations thereof. A combination of monomers, dimers, oligomers, pre-polymers, and/or polymers may be used. The term "oligomer" as used herein includes identifiable chemical groups, including dimers, trimers, tetramers and/or pentamers, linked together through reactive moieties capable of condensation. Examples include, but are not limited to, hydrolyzable moieties, hydroxyl moieties, hydrides, isocyanate moieties, amines, and combinations thereof. The reactive moieties may include, but are not limited to, hydrolyzable moieties, hydroxyl moieties and combinations thereof. Alternatively, the condensation curable organosilicon compound is selected from the group of an organosilane, an organopolysiloxane, and combinations thereof. If so, the organopolysiloxane may be selected from the group of a silanol terminated siloxane, an alkoxylsilyl-terminated siloxane, and combinations thereof. The condensation curable organosilicon compound may be different from the radical curable organosilicon compound.

The condensation curable organosilicon compound typically includes hydroxyl and/or organosiloxy groups (—SiOR) and alternatively includes hydroxyl terminated polydimethyl siloxane. The condensation curable organosilicon compound may include the general structure:

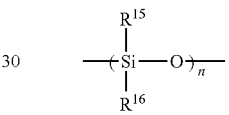

wherein each of $R^{15}$ and $R^{16}$ independently include one of a hydrogen, a hydroxyl group, an alkyl group, a halogen substituted alkyl group, an alkylenyl group, an aryl group, a halogen substituted aryl group, an alkaryl group, an alkoxy group, an acyloxy group, a ketoximate group, an amino group, an amido group, an acid amido group, an amino-oxy group, a mercapto group, and an alkenyloxy group, and wherein n may be any integer.

Alternatively, the condensation curable organosilicon compound may include hydrocarbylene and/or fluorocarbylene groups. Hydrocarbylene groups include a divalent moiety including carbon and hydrogen. Fluorocarbylene groups include a hydrocarbylene moiety with at least one of the hydrogens replaced with at least one fluorine atom. The fluorocarbylene groups may include partially or wholly fluorine substituted alkylene groups. The condensation curable organosilicon compound may also include olefinic moieties including acrylate, methacrylate, vinyl, acetylenyl, and combinations thereof.

The condensation curable organosilicon compound may include siloxanes having at least one terminal silanol group or hydrolyzable group which, upon exposure to moisture, forms silanol groups. Terminal silanol groups allow for condensation when catalyzed. The formation of silanol groups may proceed at room temperature as either a one part or two-part polymerization system and in the presence of silanol condensation catalysts.

The condensation curable organosilicon compound may be present in the composition in any amount but is typically present in an amount from 0.001 to 30, alternatively from 0.01 to 10, and alternatively from 0.01 to 5, parts by weight per 100 parts by weight of the composition.

The condensation cure catalyst may interact with the condensation curable organosilicon compound and the condensation-reactive cross-linking compound to cure the composition and reduce formation of wet surfaces after cure. Condensation cure catalysts are well known in the art and typically include, but are not limited to, titanic acid esters such as tetrabutyl titanate, tetra-t-butyl titanate, tetrapropyl titanate, partially chelated organotitanium and organozirconium compounds such as diisopropoxytitanium-di(ethylaceoacetonate) and di(n-propoxy)zirconium-di(ethylaceoacetonate), organotin compounds such as dibutyltin dilaurate, dibutyltin diacetate, dimethyltin dineodecanoate, and stannous octoate, organoaluminum compounds such as aluminum trisacetylacetonate, aluminum trisethylacetonate, diisopropoxyaluminum ethylacetonate, bismuth salts and organic carboxylic acids such as bismuth tris(2-ethylhexoate), bismuth tris(neodecanoate), chelate compounds such as zirconium tetracetylacetonate, titanium tetraacetylacetonate, organo lead compounds such as lead octylate, organovanadium compounds, amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,1-diazabicyclo(5,4,0)undecene-7 (DBU), and their salts with carboxylic acid, low-molecular-weight polyamide resins obtained from excess polyamines and poly basic acids, reaction products of excess polyamines and epoxy compounds, and combinations thereof. However, the condensation cure catalyst may be any known in the art and typically includes an organometallic compound which may include, but is not limited to, titanium, zirconium, tin, bismuth, and combinations thereof. The condensation cure catalyst may include a tin compound which may include, but is not limited to, dialkyltin (IV) salts of organic carboxylic acids such as dibutyltin diacetate, dimethyltin dilaurate, dimethyltin dineodecanoate, dibutyltin dilaurate, dibutyltin maleate and dioctyltin diacetate, tin carboxylates, such as tin octylate or tin naphthenate, reaction products of dialkyltin oxides and phthalic acid esters or alkane diones, dialkyltin diacetyl acetonates such as dibutyltin diacetylacetonate (dibutyltin acetylacetonate), dialkyltinoxides such as dibutyltinoxide, tin (II) salts of organic carboxylic acids such as tin (II) diacetate, tin (II) dioctanoate, tin(II) diethylhexanoate or tin(II) dilaurate, dialkyltin (IV) dihalides such as dimethyltin dichloride, stannous salts of carboxylic acids such as stannous octoate, stannous oleate, stannous acetate, or stannous laurate, and combinations thereof. The condensation cure catalyst may be selected from the group of dibutyltin diacetate, dibutyltin dilaurate, and combinations thereof. Either a single condensation cure catalyst or a plurality of condensation cure catalysts may be used. Typically, the condensation cure catalyst includes dibutyltin diacetate, dibutyltin dilaurate, and/or dimethyltin dineodecanoate. Alternatively, the condensation cure catalyst includes dibutyltin diacetate. The condensation cure catalyst may be present in the composition in any amount but is typically present in an amount from 0.0001 to 30, alternatively from 0.001 to 5, and alternatively from 0.001 to 2, parts by weight per 100 parts by weight of the composition.

The condensation-reactive cross-linking compound may be any condensation-reactive cross-linking compound known in the art that is useful in a condensation reaction. Typically, the condensation-reactive cross-linking compound includes an alkoxysilane and alternatively includes methacryloxypropyl trimethoxysilane and/or methacryloxymethyl trimethoxysilane. The condensation-reactive cross-linking compound may include a trialkoxysilane having at least one of an acrylate group and a methacrylate group. However, the condensation-reactive cross-linking compound may include compounds which include siloxane groups and at least two functional groups which may react with the siloxane groups and, optionally, unsaturated groups. The condensation-reactive cross-linking compounds may include, but are not limited to, the alkoxyfunctional organosilanes, described above, such as (3-glycidylpropyl)trimethoxy siloxane, glycidoxymethyltrimethoxysilane, methacryloxypropyltrimethoxysilane, methacryloxymethyltrimethoxysilane, (acryloxypropyl)trimethoxysiloxane, acryloxymethyltrimethoxysilane, and organopolysiloxanes such as (methacryloxypropyl)methylsiloxane-dimethylsiloxane copolymer, methacryloxymethyl-terminated polydimethylsiloxane, methacryloxypropylterminated polydimethylsiloxane, (acryloxypropyl)methylsiloxane-dimethylsiloxane copolymer, 3-aminopropyltriethoxysiloxane, 3-aminopropyltrimethoxysiloxane, 3-isocyanatopropyltrimethoxysiloxane, N-(2-aminoethyl)-3-aminopropyltrimethoxysiloxane, and combinations thereof. Alternatively, the condensation-reactive cross-linking compound includes an oxirane ring and an alkoxy siloxane. The condensation-reactive cross-linking compound may include acrylic and methacrylic functionality and/or mercapto functional siloxanes and isocyanato functional siloxanes. Typically, the condensation-reactive cross-linking compound includes an acrylic functional silane such as methacryloxypropyl trimethoxysilane or acryloxypropyl-trimethoxysilane.

The condensation-reactive cross-linking compound reacts with the condensation curable organosilicon compound by interacting with the condensation cure catalyst. The condensation-reactive cross-linking compound may additionally react with the radical curable organosilicon compound to react both the radical curable and condensation curable organosilicon compounds together. The condensation-reactive cross-linking compound may be present in the composition in any amount and is typically present in an amount from 0.01 to 50, alternatively from 0.1 to 20, and alternatively from 0.5 to 15, parts by weight per 100 parts by weight of the composition. The condensation-reactive cross-linking compound is not equivalent to the alkacrylates first introduced above.

The composition may further include an additive which may be selected from the group of an amine additive different from said organoborane-amine complex, a gas generating component, an adhesion promoter, an extending polymer, a softening polymer, a reinforcing polymer, a toughening polymer, a viscosity modifier, a volatility modifier, an extending filler, a reinforcing filler, a conductive filler, a spacer, a dye, a pigment, a co-monomer, a UV light absorber, a hindered amine light stabilizer, an aziridine stabilizer, a void reducing agent, a cure modifier, a free radical initiator, a diluent, a rheology modifier, an acid acceptor, an antioxidant, a heat stabilizer, a flame retardant, a silylating agent, a foam stabilizer, a surfactant, a wetting agent, a solvent, a plasticizer, a fluxing agent, a desiccant, and combinations thereof.

The additive may include the gas generating component which may include a silicon hydride, a compound including an active hydrogen atom such as water, an alcohol, and/or a carboxylic acid, and an organometallic compound. Typically, the additive includes the gas generating component when the composition is used to form a foam which may be flexible or rigid, depending on the silicon hydride, active hydrogen, and the organometallic compound. Specifically, the gas generating compound generates hydrogen gas during curing to form the foam. A pore size distribution of the foam can be controlled by any known method of foam generation to achieve any desired property such as modulus, density, and permeability.

The additive may alternatively include at least one of the extending, reinforcing, and conductive fillers which may be pre-treated with lubricants or other surface treating agents. The filler may be used to deliver the amine-reactive compound. The additive may be present in an amount from 0.0001 to 95, alternatively from 0.001 to 90, and alternatively from 0.01 to 88, parts by weight per 100 parts by weight of the composition.

The composition may also include an encapsulating compound which may be disposed about at least one of the radical curable organosilicon compound, the organoborane-amine complex, the amine-reactive compound, the condensation curable organosilicon compound, the condensation cure catalyst, and the condensation-reactive cross-linking compound. The encapsulating agent may completely surround or may partially surround any part of the composition. Typically, the encapsulating compound surrounds one or more of the radical curable organosilicon compound, the organoborane-amine complex, the condensation curable organosilicon, the condensation cure catalyst and the condensation-reactive cross-linking compound in a microphase.

The composition may also include reaction products of any of the various components of the composition provided that the organoborane-amine complex and the optional amine-reactive compound, if included, are not substantially reacted together in the presence of oxygen prior to forming the composition. As one example, the composition may include the reaction product of the radical curable organosilicon compound, the condensation curable organosilicon compound, and the condensation-reactive cross-linking compound, along with the condensation cure catalyst, the organoborane-amine complex, and optionally the amine-reactive compound. The radical curable and condensation curable organosilicon compounds may be linked together via the condensation-reactive cross-linking compound. As a further example, the composition may include the reaction product of at least two of the radical curable organosilicon compound, the condensation curable organosilicon compound, and the condensation-reactive cross-linking compound, reacted in the presence of the organoborane-amine complex, the amine-reactive compound, and the condensation cure catalyst. In this further example, it is contemplated that two or three of the radical curable organosilicon compound, the condensation curable organosilicon compound, and the condensation-reactive cross-linking compound can be pre-reacted to form the reaction product. If any of the radical curable organosilicon compound, the condensation curable organosilicon compound, or the condensation-reactive cross-linking compound are not included in the reaction product, then this unused component is still utilized and is present with the organoborane-amine complex, the condensation cure catalyst, and/or optionally the amine-reactive compound.

The composition may also be used to form an article which may include, but is not limited to, rubbers, tapes, adhesives, coatings, protective coatings, inks, films, encapsulants, gels, electronic components, photonic components, acoustic dampening components, thermoplastic articles, thermoset articles, sealants, foams, gaskets, seals, o-rings, connectors, pressure sensitive adhesives, paper coatings, release coatings, and combinations thereof. The composition may be used for preparing self-adherent silicone elastomers and gels which have numerous applications including use as die attachment adhesives, inks, lid sealants, encapsulants, gaskets, o-rings, potting compounds, release coatings, and as conformal coatings. The silicone elastomers may be capable of releasing from metal molds while at the same time adhering selectively to polymeric surfaces. Accordingly, the silicone elastomers can be co-molded or over-molded with polymeric resins in forming integrally bonded parts, such as connectors and housings for electrical wiring or electronic circuits, and diving masks for scuba diving.

As indicated above, the composition may be used in adhesives, coatings, and/or inks. These adhesives, coatings, and/or inks may be multiple component. Combinations of the radical curable organosilicon compound, the organoborane-amine complex, the amine-reactive compound, the condensation curable organosilicon compound, the condensation cure catalyst, and the condensation-reactive cross-linking compound, may be used as parts of the multiple component adhesive, coating, and/or ink. Typically, in the multiple component adhesive, coating, and/or ink, if the amine-reactive compound and the organoborane-amine complex are stored together, the conditions are anaerobic, i.e., free of oxygen. Conversely, to achieve storage stability in the presence of oxygen, the organoborane-amine complex and the amine-reactive compound are typically physically and/or chemically isolated. For example, the composition may be rendered air stable by packaging the organoborane-amine complex separately from the amine-reactive compound. Alternatively, the organoborane-amine complex and the amine-reactive compound may be encapsulated and/or delivered in separate phases. This can be accomplished by storing one or both in a solid form that prevents their intimate mixing, such as by encapsulation. If the composition is used in the multiple component adhesive, the multiple component adhesive, coating, and/or ink, may be substantially free of alkacrylates and specifically methylmethacrylate and polymethylmethacrylate. The composition may be cured as a single or multi-component adhesive, coating, and/or ink by heating.

Alternatively, the article includes a first layer and a second layer formed from the composition and disposed on the first layer. The second layer may or may not be in direct contact with the first layer, and in this article. The second layer is typically heat cured. The article may also include a third layer disposed on the second layer. The third layer may or may not be in direct contact with the second layer. Typically, the third layer is disposed on the second layer and sandwiches the second layer between the first layer and the third layer.

Typically, the article is formed by bonding the second layer to the first layer which may be accomplished by curing the composition and achieving sufficient adherence such that the composition and the first layer are bonded together securely to form the article. Alternatively, the article is made by disposing the composition onto the first layer at a temperature less than the boiling point of water (100° C.), and then concurrently curing the composition. This obviates the need to pre-dry the first and/or third layers.

Further, at least one of the first and third layers may be selected from the group of an organic material, a thermoplastic material, a thermoset material, a metallic material, a ceramic material, an inorganic material, and combinations thereof. At least one of the first and third layers may also be selected from the group of unmodified syndiotactic polystyrene (PS), polytetrafluoroethylene (PTFE), polyethylene (PE), polypropylene (PP), polybutylene terephthalate, polyethylene terephthalate (PET), polycarbonate, epoxies (e.g., epoxy thermoset materials), polyimides, acrylonitrile-butadiene-styrene (ABS), poly(phenyleneoxide), polyphthalamides, polyamides, and combinations thereof.

The composition may be cured at any temperature and for any time. Typically, the composition is cured at a temperature from −100 to 300, alternatively from 0 to 100, and alternatively from 15 to 35, ° C. The composition may be cured for a time of at least 5 seconds, alternatively from 30 seconds to 24 hours, and alternatively from 15 seconds to 2 hours. The upper temperature for curing the composition may be less than 80° C. For maximum benefit, the temperature typically ranges from 40 to 80, alternatively from 0 to 60, and alternatively from 15 to 35, ° C. The composition may be applied to the first and/or third layers by meter mixing, extruding, and/or using robotic or manual application.

The invention also provides the method of forming the composition. If the composition does not include the amine-reactive component, then the various components of the composition can be combined in any manner, including all components simply in one vessel. On the other hand, if the composition includes the amine-reactive component, then two vessels or reactors are typical because, as alluded to above, it is important that the organoborane-amine complex and the optional amine-reactive compound are not together, i.e., exposed to one another, in the presence of oxygen prior to forming the composition. It is not absolutely required; however, it is most desirable to keep the organoborane-amine complex and the amine-reactive compound separate from one another utilizing different vessels until reaction of all components is desired.

In this particular method where the amine-reactive compound is part of the composition, the radical curable organosilicon compound, the condensation curable organosilicon compound, the condensation cure catalyst, and the condensation-reactive cross-linking compound are introduced into at least one of a first vessel and a second vessel. In other words, any one of the aforementioned components can be introduced into either the first vessel, the second vessel, or into both of the first and second vessels, i.e., a portion of these components in both vessels. In this method, the organoborane-amine complex is introduced into one of the first or second vessel and the amine-reactive compound is introduced into the other of the first or second vessel. For descriptive purposes only, the organoborane-amine complex is described as being introduced into the first vessel, and the amine-reactive compound is described as being introduced into the second vessel. The organoborane-amine complex and the amine reactive compound are then combined. That is, the contents of the first and second vessels are combined bringing all components of the composition together. The contents of the first vessel may be added to the second vessel, the contents of the second vessel may be added to the first vessel, or the contents of both of the first and second vessels may be added into a third vessel. Additionally, the first and/or second vessels may be, and are typically, substantially free of oxygen and moisture. In embodiments where any two or at least two of the radical curable organosilicon compound, the condensation curable organosilicon compound, and the condensation-reactive cross-linking compound are reacted to form a reaction product, the method of the present invention includes steps allowing for reaction and/or combination of these components.

In any method, the introduction and/or combination may be accomplished by any procedures and mechanisms known in the art. In one embodiment, combination is accomplished at a desired volume ratio in air in a bag or through a pressurized gun. While there is no restriction on a mixing ratio of contents of the first and second vessels, typically the mixing ratio of the contents of the first vessel to the contents of the second vessel is from 0.05:1 to 20:1. Alternatively, the mixing ratio is from 0.1:1 to 10:1.

The following examples illustrating the formation of and the use of the composition of the present invention, as presented herein, are intended to illustrate and not limit the invention.

EXAMPLES

Eighteen curable organosilicon compositions, Compositions 1 through 18, are formed and then cured to produce Cured Compositions 1 through 18. Additionally, two control compositions, Control Compositions 1 and 2, are also formed and then cured to produce Cured Control Compositions 1 and 2. The Cured Compositions 1 and 2 and the Cured Control Composition 1 are evaluated for dynamic storage modulus, a rheological property, set forth in Table 1 below. Additionally, the Cured Compositions 3 through 18 and the Cured Control Composition 2 are evaluated for Gelation Time, Dry Time, and Surface Texture, as set forth in Table 2 below.

Example 1

To formulate the Composition 1, a first and a second mixture are formed in two vessels, respectively, using a Hauschild rotary mixer. The first mixture includes:

2.87 grams of hydroxyl-terminated polydimethyl siloxane (—OH PDMS) having a number average molecular weight of 44,000 g/mol, as the condensation curable organosilicon compound;

2.87 grams of methacryloxypropyl-terminated polydimethyl siloxane (MA-PDMS) having a number average molecular weight of 13,000 g/mol, as the radical curable organosilicon compound;

0.03 grams of dibutyl-tin-diacetate (DBTDA), as the condensation cure catalyst; and 0.23 grams of a complex of tri-n-butylborane complexed with 1.3 molar equivalents of 3 methoxypropylamine, as the organoborane-amine complex.

The second mixture includes:

5.51 grams of MA-PDMS having a number average molecular weight of 13,000 g/mol, as the radical curable organosilicon compound;

0.19 grams of isophorone diisocyanate (IPDI), as the amine-reactive compound; and 0.30 grams of methacryloxypropyl trimethoxysilane (MAPTS), as the condensation-reactive cross-linking compound.

After formation of the first and second mixtures, 1.52 grams of each of the first and second mixtures are combined in a polyethylene bag and mixed for 30 seconds to form the Composition 1. A sample of the Composition 1 is immediately dispensed between two 25 mm parallel plates in a Rheometrics RDA II Rheometer brought to a gap setting of 1.50 mm. Then, measurement of the dynamic storage modulus (G') is completed at a fixed frequency of 10 rads/s with a nominal strain of 2.0%, as the sample cures at 20° C. (G'(20)). The rheometer automatically maintains constant normal force and strain during the measurement to correct for any dimensional changes. After curing for 24 hours, the sample is heated to 150° C. (G'(150)) for a frequency sweep to determine an effect of heating of G'. A ratio of (G'(150)) to (G'(20)) is calculated to give an indication of temperature sensitivity and stability of the sample, and set forth in Table 1 below.

Example 2

Composition 2 is formed in the same way as Composition 1, except that different amounts of the —H PDMS, MA- PDMS, the organoborane-amine complex, the DBTDA, and the IPDI, are utilized. Also, methacryloxymethyltrimethoxysilane (MAMTS) is substituted for MAPTS. Specifically, 3.83 grams of —OH PDMS, 3.83 grams of MA-PDMS and 0.31 grams of the complex including tri-n-butylborane complexed with 1.3 molar equivalents of 3-methoxypropylamine is prepared, as a third mixture. Additionally, 7.47 grams of MA-PDMS, 0.25 grams of IPDI and 0.28 grams of MAMTS are combined, as a fourth mixture. After formation of the third and fourth mixtures, 2.07 grams of each of the third and fourth mixtures are combined in a polyethylene bag and mixed for 30 seconds to form the Composition 2. The Composition 2 is then evaluated in the identical way as the Composition 1 above, and the results are set forth in Table 1, below. Additionally, Composition 2 is re-cooled to 20° C. after measurements at 150° C. and re-tested for the dynamic storage modulus, G'(20) n . A ratio G'(20):G'(20) n is also calculated and set forth in Table 1 below.

Control Example 1

To formulate the Control Composition 1, a first and a second comparative mixture are formed in two vessels, respectively, using a Hauschild rotary mixer. The first comparative mixture includes:
  4.42 grams of OH-PDMS, as the condensation curable organosilicon compound;
  0.20 grams of DBTDA as the condensation cure catalyst;
  0.39 grams of a complex of tri-n-butylborane complexed with 1.3 molar equivalents of 3-methoxypropylamine, as the organoborane-amine complex.
The second comparative mixture includes:
  0.303 grams of Cab-O-Sil TS610, a dimethylsilylated fumed silica filler, commercially available from Cabot Corporation, of Boston, Mass.;
  3.98 grams of methyl methacrylate;
  0.21 grams of IPDI, as the amine-reactive compound; and
  0.51 grams of 3-acryloxypropyltrimethoxysilane.
After formation of the first and second comparative mixtures, 2.12 grams of each of the first and second comparative mixtures are combined in a polyethylene bag and mixed for 30 seconds to form the Control Composition 1. The Control Composition 1 is then evaluated in the identical way as the Composition 2 above, and the results are set forth in Table 1, below.

TABLE 1

|  | Cured Composition 1 | Cured Composition 2 | Cured Control Composition 1 |
| --- | --- | --- | --- |
| G'(20) (Pa) | 251,000 | 262,000 | 7,340,000 |
| G' (150) (Pa) | 430,000 | 420,000 | 31,000 |
| G'(20)* (Pa) | 390,000 | 330,000 | 190,000 |
| Ratio G'(20):G'(150) | 0.58 | 0.63 | 235.48 |
| Ratio G'(20):G'(20)* | 0.64 | 0.79 | 38.42 |

*denotes G' measured at 20° C. after heating for one hour at 150° C.

These results show that both the Cured Compositions 1 and 2 are softer and more compliant initially and are less affected by high temperatures than the Cured Control Composition 1. As shown by the ratio of G'(20):G'(20) n, the modulus recovered after heating to 150° C. is closer to a starting modulus of the Cured Compositions 1 and 2 than to a starting modulus of the Cured Control Composition 1, suggesting an improved heat stability of the Cured Compositions 1 and 2.

Example 3

Composition 3 is formed in the same way as Composition 1, except that different amounts of the —OH PDMS, MA-PDMS, the DBTDA, the IPDI, and the MAPTS are utilized. Additionally, a different organo-borane amine complex is utilized. Specifically, 2.335 grams of —OH PDMS, 2.337 grams of MA-PDMS and 0.337 grams of a complex including tri-n-butylborane complexed with 1.2 molar equivalents of N-(2-aminoethyl)-3-3aminopropyltrimethoxysilane is prepared, as a fifth mixture. Additionally, 4.536 grams of MA-PDMS, 0.049 grams of DBTDA, 0.163 grams of IPDI and 0.255 grams of MAPTS are combined, as a sixth mixture. After formation of the fifth and sixth mixtures, 2.5 grams of each of the fifth and sixth mixtures are combined in a polyethylene bag and mixed for 30 seconds to form the Composition 3. The Composition 3 is applied in an approximately 0.05 inch thick single layer onto a polyester film to cure at room temperature. The polyester film is commercially available from Exotic Automation & Supply of Freeland, Mich., under the trade name of Mylar A. The Composition 3 is evaluated for Gelation Time, Dry Time, and Surface Texture, as set forth in Table 2 below.

Example 4

Composition 4 is formed in the same way as Composition 1, except that different amounts of the —OH PDMS, MA-PDMS, the organoborane-amine complex, the DBTDA, the IPDI, and the MAPTS are utilized. Specifically, 2.41 grams of —OH PDMS, 2.41 grams of MA-PDMS and 0.18 grams of a complex including tri-n-butylborane complexed with 1.3 molar equivalents of 3-methoxypropylamine is prepared, as a seventh mixture. Additionally, 4.54 grams of MA-PDMS, 0.05 grams of DBTDA, 0.16 grams of IPDI and 0.25 grams of MAPTS are combined, as an eighth mixture. After formation of the seventh and eighth mixtures, 2.2 grams of each of the seventh and eighth mixtures are combined in a polyethylene bag and mixed for 30 seconds to form the Composition 4. The Composition 4 is applied in an approximately 0.05 inch thick single layer onto the polyester film to cure at room temperature. The Composition 4 is evaluated for Gelation Time, Dry Time, and Surface Texture, as set forth in Table 2 below.

Example 5

Composition 5 is formed in the same way as Composition 1, except that different amounts of the —OH PDMS, MA-PDMS, the DBTDA, the IPDI, and the MAPTS are utilized. Additionally, a different organo-borane amine complex is utilized. Specifically, 2.34 grams of —OH PDMS, 2.34 grams of MA-PDMS and 0.32 grams of a complex including triethylborane complexed with 1.5 molar equivalents of 3-aminopropyltriethoxysilane is prepared, as a ninth mixture. Additionally, 4.54 grams of MA-PDMS, 0.05 grams of DBTDA, 0.17 grams of IPDI and 0.25 grams of MAPTS are combined, as a tenth mixture. After formation of the ninth and tenth mixtures, 2.2 grams of each of the ninth and tenth mixtures are combined in a polyethylene bag and mixed for 30 seconds to form the Composition 5. The Composition 5 is applied in an approximately 0.05 inch thick single layer onto the polyester film to cure at room temperature. The Composition 5 is evaluated for Gelation Time, Dry Time, and Surface Texture, as set forth in Table 2 below.

Example 6

Composition 6 is formed in the same way as Composition 1, except that different amounts of the —OH PDMS, MA-PDMS, the DBTDA, the IPDI, and the MAPTS are utilized. Additionally, a different organo-borane amine complex is utilized. Specifically, 2.42 grams of —OH PDMS, 2.43 grams of MA-PDMS and 0.16 grams of a complex including triethylborane complexed with an equimolar amount of 1,3-propanediamine is prepared, as an eleventh mixture. Additionally, 4.51 grams of MA-PDMS, 0.05 grams of DBTDA, 0.19 grams of IPDI and 0.25 grams of MAPTS are combined, as a twelfth mixture. After formation of the eleventh and twelfth mixtures, 1.8 grams of each of the eleventh and twelfth mixtures are combined using the Hauschild rotary mixer for 15 seconds to form the Composition 6. The Composition 6 is applied in an approximately 0.05 inch thick single layer onto the polyester film to cure at room temperature. The Composition 6 is evaluated for Gelation Time, Dry Time, and Surface Texture, as set forth in Table 2 below.

Example 7

Composition 7 is formed in the same way as Composition 1, except that different amounts of the —OH PDMS, MA-PDMS, the DBTDA, the IPDI, and the MAPTS are utilized. Additionally, a different organo-borane amine complex is utilized. Specifically, 2.39 grams of —OH PDMS, 2.39 grams of MA-PDMS and 0.22 g of a complex including triethylborane complexed with 1.2 molar equivalents of 3-aminopropyltrimethoxysilane is prepared, as a thirteenth mixture. Additionally, 4.54 grams of MA-PDMS, 0.05 grams of DBTDA, 0.17 grams of IPDI and 0.25 grams of MAPTS are combined, as a fourteenth mixture. After formation of the thirteenth and fourteenth mixtures, 2.4 grams of each of the thirteenth and fourteenth mixtures are combined in a polyethylene bag and mixed for 30 seconds to form the Composition 7. The Composition 7 is applied in an approximately 0.05 inch thick single layer onto the polyester film to cure at room temperature. The Composition 7 is evaluated for Gelation Time, Dry Time, and Surface Texture, as set forth in Table 2 below.

Example 8

Composition 8 is formed in the same way as Composition 1, except that different amounts of the —OH PDMS, MA-PDMS, the IPDI, the organo-borane amine complex, and the MAPTS are utilized. Additionally, dibutyltindilaurate is substituted for the DBTDA. Specifically, 2.33 grams of —OH PDMS, 2.35 grams of MA-PDMS and 0.34 grams of a complex including tri-n-butylborane complexed with 1.2 molar equivalents of N-(2-aminoethyl)-3-aminopropyltrimethoxysilane is prepared, as a fifteenth mixture. Additionally, 4.53 grams of MA-PDMS, 0.05 grams of dibutyltindilaurate, 0.16 grams of IPDI and 0.25 grams of MAPTS are combined, as a sixteenth mixture. After formation of the fifteenth and sixteenth mixtures, 1.8 grams of each of the fifteenth and sixteenth mixtures are combined using the Hauschild rotary mixer for 15 seconds to form the Composition 8. The Composition 8 is applied in an approximately 0.05 inch thick single layer onto the polyester film to cure at room temperature. The Composition 8 is evaluated for Gelation Time, Dry Time, and Surface Texture, as set forth in Table 2 below.

Example 9

Composition 9 is formed in the same way as Composition 6, except that acrylic acid is substituted for the IPDI, as the amine-reactive compound, in an equimolar amount (based on amine reactive groups). An amount of the MA-PDMS, as originally combined in Composition 6 with the IPDI and the MAPTS, is adjusted to compensate for differences in the mass of the acrylic acid needed to form Composition 9. Specifically, 4.58 grams of the MA-PDMS are utilized. The Composition 9 is evaluated for Gelation Time, Dry Time, and Surface Texture, as set forth in Table 2 below.

Example 10

Composition 10 is formed in the same way as Composition 6, except that methacrylic anhydride is substituted for the IPDI, as the amine-reactive compound, in an equimolar amount (based on amine reactive groups). An amount of the MA-PDMS, as originally combined in Composition 6 with the IPDI and the MAPTS, is adjusted to compensate for differences in the mass of the methacrylic anhydride needed to form Composition 10. Specifically, 4.45 grams of the MA-PDMS are utilized. The Composition 10 is evaluated for Gelation Time, Dry Time, and Surface Texture, as set forth in Table 2 below.

Example 11

Composition 11 is formed in the same way as Composition 6, except that undecylenic acid is substituted for the IPDI, as the amine-reactive compound, in an equimolar amount (based on amine reactive groups). An amount of the MA-PDMS, as originally combined in Composition 6 with the IPDI and the MAPTS, is adjusted to compensate for differences in the mass of the undecylenic acid needed to form Composition 11. Specifically, 4.40 grams of the MA-PDMS are utilized. The Composition 11 is evaluated for Gelation Time, Dry Time, and Surface Texture, as set forth in Table 2 below.

Example 12

Composition 12 is formed in the same way as Composition 6, except that citraconic anhydride is substituted for the IPDI, as the amine-reactive compound, in an equimolar amount (based on amine reactive groups). An amount of the MA-PDMS, as originally combined in Composition 6 with the IPDI and the MAPTS, is adjusted to compensate for differences in the mass of the citraconic anhydride needed to form Composition 12. Specifically, 4.51 grams of the MA-PDMS are utilized. The Composition 12 is evaluated for Gelation Time, Dry Time, and Surface Texture, as set forth in Table 2 below.

Example 13

Composition 13 is formed in the same way as Composition 6, except that polyacrylic acid is substituted for the IPDI, as the amine-reactive compound, in an equimolar amount (based on amine reactive groups). An amount of the MA-PDMS, as originally combined in Composition 6 with the IPDI and the MAPTS, is adjusted to compensate for differences in the mass of the polyacrylic acid needed to form Composition 13. Specifically, 4.58 grams of the MA-PDMS are utilized. The Composition 13 is evaluated for Gelation Time, Dry Time, and Surface Texture, as set forth in Table 2 below.

Example 14

To formulate the Composition 14, seventeenth and eighteenth mixtures are formed in two vessels, respectively, using a Hauschild rotary mixer. The seventeenth mixture includes 1.87 grams of OH-PDMS, 1.87 grams of MA-PDMS, and 0.26 grams of a complex including tri-n-butylborane complexed with 1.2 molar equivalents of N-(2-aminoethyl)-3-aminopropyltrimethoxysilane. The eighteenth mixture includes 3.60 grams of MA-PDMS, 0.04 grams of DBTDA, 0.12 grams of IPDI, 0.20 grams of MAPTS, and 0.039 grams of an adhesion promoter including the reaction product of a slight molar excess of tetraethoxysilane and ethylene glycol. After formation of the seventeenth and eighteenth mixtures, 1.8 grams of each of the seventeenth and eighteenth mixtures are combined using the Hauschild rotary mixer for 15 seconds to form the Composition 14. The Composition 14 is evaluated for Gelation Time, Dry Time, and Surface Texture, as set forth in Table 2 below.

Example 15

Composition 15 is formed in the same way as Composition 1, except that different amounts of the —OH PDMS, MA-PDMS, the DBTDA, the organoborane-amine complex, and the MAPTS are utilized. Additionally, methyl acrylate is substituted for the IPDI, as the amine-reactive compound, in an equimolar amount (based on amine reactive groups). Specifically, 2.39 g of —OH PDMS, 2.39 grams of MA-PDMS, and 0.22 g of a complex including tri-n-butyl borane complexed with 1.3 molar equivalents of 3-methoxypropylamine, is prepared as a first mixture. Additionally, 4.57 grams of MA-PDMS, 0.05 grams of DBTDA, 0.13 grams of Methyl Acrylate and 0.25 grams of MAPTS are combined, as a second mixture. After formation of the first and second mixtures, 2.04 grams of each of the first and second mixtures are combined in a polyethylene bag and mixed for 30 seconds to form Composition 15. The Composition 15 is applied in an approximately 0.05 inch thick single layer onto the polyester film to cure at room temperature. The Composition 15 is evaluated for Gelation Time, Dry Time, and Surface Texture, as set forth in Table 2 below.

Example 16

Composition 16 is formed in the same way as Composition 15, except that that different amounts of the —OH PDMS, MA-PDMS, the IPDI, the organoborane-amine complex, and the MAPTS are utilized. Additionally, Dimethylneodecanoatetin is substituted for the DBTDA. Specifically, 2.36 g of OH PDMS, 2.36 grams of MA-PDMS, 0.07 g of Dimethylneodecanoatetin and 0.20 g of a complex including tri-n-butyl borane complexed with 1.3 molar equivalents of 3-methoxypropylamine, is prepared as a first mixture. Additionally, 4.59 grams of MA-PDMS, 0.16 grams of IPDI and 0.26 grams of MAPTS are combined, as a second mixture. After formation of the first and second mixtures, 2.43 grams of each of the first and second mixtures are combined in a polyethylene bag and mixed for 30 seconds to form Composition 16. The Composition 16 is applied in an approximately 0.05 inch thick single layer onto the polyester film to cure at room temperature. The Composition 16 is evaluated for Gelation Time, Dry Time, and Surface Texture, as set forth in Table 2 below.

Example 17

Composition 17 is formed in the same way as Composition 1, except that different amounts of the —OH PDMS, MA-PDMS, the DBTDA, the IPDI, the organoborane-amine complex, and the MAPTS are utilized. Specifically, 1.71 g of —OH PDMS, 1.71 grams of MA-PDMS, and 0.57 g of a complex including tri-n-butyl borane complexed with 1.3 molar equivalents of 3-methoxypropylamine, is prepared as a first mixture. Additionally, 3.34 grams of MA-PDMS, 0.04 grams of DBTDA, 0.45 grams of IPDI and 0.19 grams of MAPTS are combined, as a second mixture. After formation of the first and second mixtures, 2.17 grams of each of the first and second mixtures are combined in a polyethylene bag and mixed for 30 seconds to form Composition 17. The Composition 17 is applied in an approximately 0.05 inch thick single layer onto the polyester film to cure at room temperature. The Composition 17 is evaluated for Gelation Time, Dry Time, and Surface Texture, as set forth in Table 2 below.

Example 18

To formulate Composition 18, a first and a second mixture are formed in two vessels, respectively, using a Hauschild rotary mixer. The first mixture includes:
 4.35 grams of methacryloxypropyl, dimethoxysilyl-terminated polydimethylsiloxane having a number average molecular weight of 60,000 g/mol, as the radical curable organosilicon compound;
 0.22 grams of treated fumed silica filler (Cab-O-Sil TS-610); and
 0.43 grams of a complex of tri-n-butylborane complexed with 1.3 molar equivalents of 3 methoxypropylamine, as the organoborane-amine complex.
The second mixture includes:
 4.35 grams of methacryloxypropyl, dimethoxysilyl-terminated polydimethylsiloxane having a number average molecular weight of 60,000 g/mol, as the radical curable organosilicon compound;
 0.22 grams of treated fumed silica filler (Cab-O-Sil TS-610); and
 0.43 grams of isophorone diisocyanate (IPDI), as the optional amine-reactive compound.

After formation of the first and second mixtures, 3.01 grams of the first mixture is placed in a Hauschild mixing cup, followed by 0.030 grams of tetra(tert-butyl) titanate (TTBT). The components are mixed for a 15 sec cycle. Next, 3.00 grams of the second mixture is placed in the same Hauschild mixing cup, followed by 0.029 grams of TTBT. The combined mixture is mixed for a 15 sec cycle. The mixing cup is opened, the mixture quickly stirred by hand and then applied in an approximately 0.05 inch thick single layer onto the polyester film to cure at room temperature. The Composition 18 is evaluated for Gelation Time, Dry Time, and Surface Texture, as set forth in Table 2 below.

In Composition 18, the radical curable organosilicon compound, the condensation curable organosilicon compound and the condensation-reactive cross-linking compound for cross-linking the condensation curable organosilicon compound are present together in the form of the methacryloxypropyl, dimethoxysilyl-terminated polydimethylsiloxane having a number average molecular weight of 60,000 g/mol. This molecule is prepared by mixing 100 grams of hydroxyl-terminated PDMS of approximately 60,000 g/mol with MAPTS with 2.5 grams of MAPTS and 0.1 grams TTBT as the catalyst and allowing the mixture to react at room temperature for 24 hours.

Control Example 2

To formulate the Control Composition 2, a third and a fourth comparative mixture are formed in two vessels, respectively, using a Hauschild rotary. The third comparative mixture includes:

4.683 grams of MA-PDMS, as the radical curable organosilicon compound; and 0.349 grams of a complex of tri-n-butylborane complexed with 1.2 molar equivalents of N-(2-aminoethyl)-3-aminopropyltrimethoxysilane, as the organoborane-amine complex.

The fourth comparative mixture includes:

4.837 grams of MA-PDMS, as the radical curable organosilicon compound; and 0.175 grams of IPDI, as the amine-reactive compound.

After formation of the third and fourth comparative mixtures, 2.5 grams of each of the third and fourth comparative mixtures are combined in a polyethylene bag and mixed for 30 seconds to form the Control Composition 2. The Control Composition 2 is applied in approximately a 0.05 inch thick single layer onto the polyester film to cure at room temperature. The Control Composition 2 is evaluated for Gelation Time, Dry Time, and Surface Texture, as set forth in Table 2 below.

While curing, each of the Compositions 3 through 18 and the Control Composition 2 are periodically probed with a metal spatula to determine whether each has cured and whether the surface of each is granular or smooth. A cure rate is estimated by observing the time at which the bulk of each of the Compositions 3 through 18 and the Control Composition 2 is no longer flowable when sheared with the spatula. This time is reported as Gelation Time. Dry Time is estimated by observing a time at which the bulk of each of the Compositions 3 through 18 and the Control Composition 2 is no longer wet, as determined using the spatula. Surface Texture is determined through examination of the surfaces with a spatula to determine whether each surface is granular or smooth. The results are set forth in Table 2 below

TABLE 2

|  | Cured Composition 3 | Cured Composition 4 | Cured Composition 5 |
|---|---|---|---|
| Gelation Time (sec) | 70 | 120 | 105 |
| Dry Time (min) | 15 | 60 | 15 |
| Surface Texture (Granular/Smooth) | Smooth | Smooth | Smooth |

|  | Cured Composition 6 | Cured Composition 7 | Cured Composition 8 |
|---|---|---|---|
| Gelation Time (sec) | 30 | 105 | 180 |
| Dry Time (min) | 15 | 15 | 60 |
| Surface Texture (Granular/Smooth) | Smooth | Smooth | Smooth |

|  | Cured Composition 9 | Cured Composition 10 | Cured Composition 11 |
|---|---|---|---|
| Gelation Time (sec) | Instantaneous | 40 | 30 |
| Dry Time (min) | 15 | 60 | 60 |
| Surface Texture (Granular/Smooth) | Smooth | Smooth | Smooth |

|  | Cured Composition 12 | Cured Composition 13 | Cured Composition 14 |
|---|---|---|---|
| Gelation Time (sec) | 3600 | 900 | 90 |
| Dry Time (min) | 60 | 15 | 384 |
| Surface Texture (Granular/Smooth) | Smooth | Smooth | Smooth |

TABLE 2-continued

|  | Cured Composition 15 | Cured Composition 16 | Cured Composition 17 |
|---|---|---|---|
| Gelation Time (sec) | 180 | 120 | 120 |
| Dry Time (min) | 15 | 75 | 60 |
| Surface Texture (Granular/Smooth) | Smooth | Smooth | Smooth |

|  | Cured Composition 18 | Cured Control Composition 2 |
|---|---|---|
| Gelation Time (sec) | 15 | 45 |
| Dry Time (min) | 60 | >1440 |
| Surface Texture (Granular/Smooth) | Smooth | Granular |

As shown in Table 2, the Compositions 3 through 18 of the present invention cure in a shorter time than the Control Composition 2 and with dry and smooth surfaces. Also, the Cured Compositions 4 through 7 demonstrate that a relatively rapidly curing elastomeric material with a dry surface can be formed using a variety of organoborane-amine complexes. Further, Cured Composition 8 taken with Cured Composition 3 demonstrates that a relatively rapidly curing elastomeric material with a dry surface can be formed using various condensation catalysts. Still further, the Cured Composition 14 demonstrates that addition of the adhesion promoter can be added without affecting the ability of the Composition 14 to cure and form a smooth and dry surface. Additionally, Cured Composition 15 demonstrates that acrylates can be used as amine-reactive compounds, while Cured Composition 16 demonstrates that a variety of tin catalysts can be effectively used. Also, Cured Composition 18 demonstrates that pre-reaction of components of the instant invention can be used to achieve the desired results.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A curable organosilicon composition comprising:
   a radical curable organopolysiloxane present in an amount of from greater than 10 to 95 parts by weight per 100 parts by weight of the composition;
   an organoborane-amine complex comprising a complex of an organoborane and an amine;
   a condensation curable organosilicon compound;
   a condensation cure catalyst; and
   a condensation-reactive cross-linking compound for cross-linking said condensation curable organosilicon compound,
   wherein at least two of said radical curable organopolysiloxane, said condensation curable organosilicon compound, and said condensation-reactive cross-linking compound are pre-reacted.

2. A composition as set forth in claim 1 further comprising an amine-reactive compound.

3. A composition as set forth in claim 2 wherein said amine-reactive compound is selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof or is selected from the group of amine-reactive silanes, amine-reactive organosiloxanes, and combinations thereof.

4. A composition as set forth in claim 2 wherein said amine-reactive compound is present in an amount wherein a molar ratio of amine-reactive groups to amine groups in said curable organosilicon composition is of 0.1 to 100.

5. A composition as set forth in claim 1 wherein said composition is substantially free of radical curable compounds that do not include one or more silicon atoms.

6. A composition as set forth in claim 1 wherein said radical curable organopolysiloxane comprises at least one of an acrylate group and a methacrylate group.

7. A composition as set forth in claim 1 wherein said organoborane is selected from the group of tri-methylborane, tri-ethylborane, tri-n-butylborane, tri-n-octylborane, tri-sec-butylborane, tridodecylborane, phenyldiethylborane, and combinations thereof or is an organosilicon-functional organoborane and comprises a organosilicon-functional group comprising at least one of a silicon atom, a siloxane oligomer, and a siloxane polymer.

8. A composition as set forth in claim 1 wherein said amine comprises at least one of an alkyl group, an alkoxy group, an imidazole group, an amidine group, a ureido group, and combinations thereof or is selected from the group of amine-functional silanes, amine-functional organopolysiloxanes, and combinations thereof.

9. A composition as set forth in claim 1 wherein said organoborane-amine complex is bound to a solid particle.

10. A composition as set forth in claim 1 wherein said condensation curable organosilicon compound is selected from the group of an organosilane, an organopolysiloxane, and combinations thereof.

11. A composition as set forth in claim 1 wherein said condensation curable organosilicon compound comprises hydroxyl terminated polydimethyl siloxane.

12. A composition as set forth in claim 1 wherein said condensation curable organosilicon compound is present in said composition in an amount of from 0.001 to 30 parts by weight per 100 parts by weight of said composition.

13. A composition as set forth in claim 1 wherein said condensation cure catalyst comprises an organometallic compound selected from the group of titanium, zirconium, tin, bismuth, and combinations thereof.

14. A composition as set forth in claim 1 wherein said condensation cure catalyst is selected from the group of dibutyltin diacetate, dibutyltin dilaurate, dimethyltin dineodecanoate, and combinations thereof.

15. A composition as set forth in claim 1 wherein said condensation cure catalyst is present in said composition in an amount of from 0.001 to 5 parts by weight per 100 parts by weight of said composition.

16. A composition as set forth in claim 1 wherein said condensation-reactive cross-linking compound comprises an alkoxysilane.

17. A composition as set forth in claim 1 wherein said condensation-reactive cross-linking compound comprises a trialkoxysilane having at least one of an acrylate group and a methacrylate group.

18. A composition as set forth in claim 1 wherein said condensation-reactive cross-linking compound is present in an amount of from 0.1 to 20 parts by weight per 100 parts by weight of said composition.

19. A composition as set forth in claim 1 further comprising an encapsulating compound disposed about at least one of said radical curable organopolysiloxane, said organoborane-amine complex, said condensation curable organosilicon compound, said condensation cure catalyst, and said condensation-reactive cross-linking compound.

20. A composition as set forth in claim 1 wherein said composition is substantially free of acrylates.

21. An article formed from said composition as set forth in claim 1 and selected from the group of rubbers, tapes, adhesives, inks, coatings, protective coatings, films, encapsulants, gels, electronic components, photonic components, acoustic dampening components, thermoplastic articles, thermoset articles, sealants, foams, gaskets, seals, o-rings, connectors, pressure sensitive adhesives, paper coatings, release coatings, and combinations thereof.

22. A method of forming a curable organosilicon composition comprising a radical curable organopolysiloxane, an organoborane-amine complex, an amine-reactive compound, a condensation curable organosilicon compound, a condensation cure catalyst, and a condensation-reactive cross-linking compound, said method comprising the steps of:
introducing from greater than 10 to 95 parts by weight of the radical curable organopolysiloxane per 100 parts by weight of the composition, the condensation curable organosilicon compound, the condensation cure catalyst, and the condensation-reactive cross-linking compound into at least one of a first vessel and a second vessel;
introducing the organoborane-amine complex into the first vessel;
introducing the amine-reactive compound into the second vessel; and
combining the organoborane-amine complex and the amine reactive compound,
wherein at least two of said radical curable organopolysiloxane, said condensation curable organosilicon compound, and said condensation-reactive cross-linking compound are pre-reacted.

23. A method as set forth in claim 22 wherein the first vessel and second vessels are substantially free of oxygen and moisture.

24. A curable organosilicon composition comprising:
(A) a reaction product of any two of;
(i) a radical curable organopolysiloxane,
(ii) a condensation curable organosilicon compound, and
(iii) a condensation-reactive cross-linking compound;
(B) the other of (i), (ii), and (iii) that is not reacted as part of said reaction product (A);
(C) an organoborane-amine complex; and
(D) a condensation cure catalyst, wherein said organopolysiloxane is reacted in an amount of from greater than 10 to 95 parts by weight per 100 parts by weight of the composition.

25. A composition as set forth in claim 24 further comprising an amine-reactive compound.

* * * * *